March 17, 1942.  R. R. BLOSS  2,276,561

ROTARY DRILLING MACHINE

Filed June 5, 1939  4 Sheets-Sheet 1

Inventor
RICHARD R. BLOSS
By
E. V. Hanelwoy,
Attorney

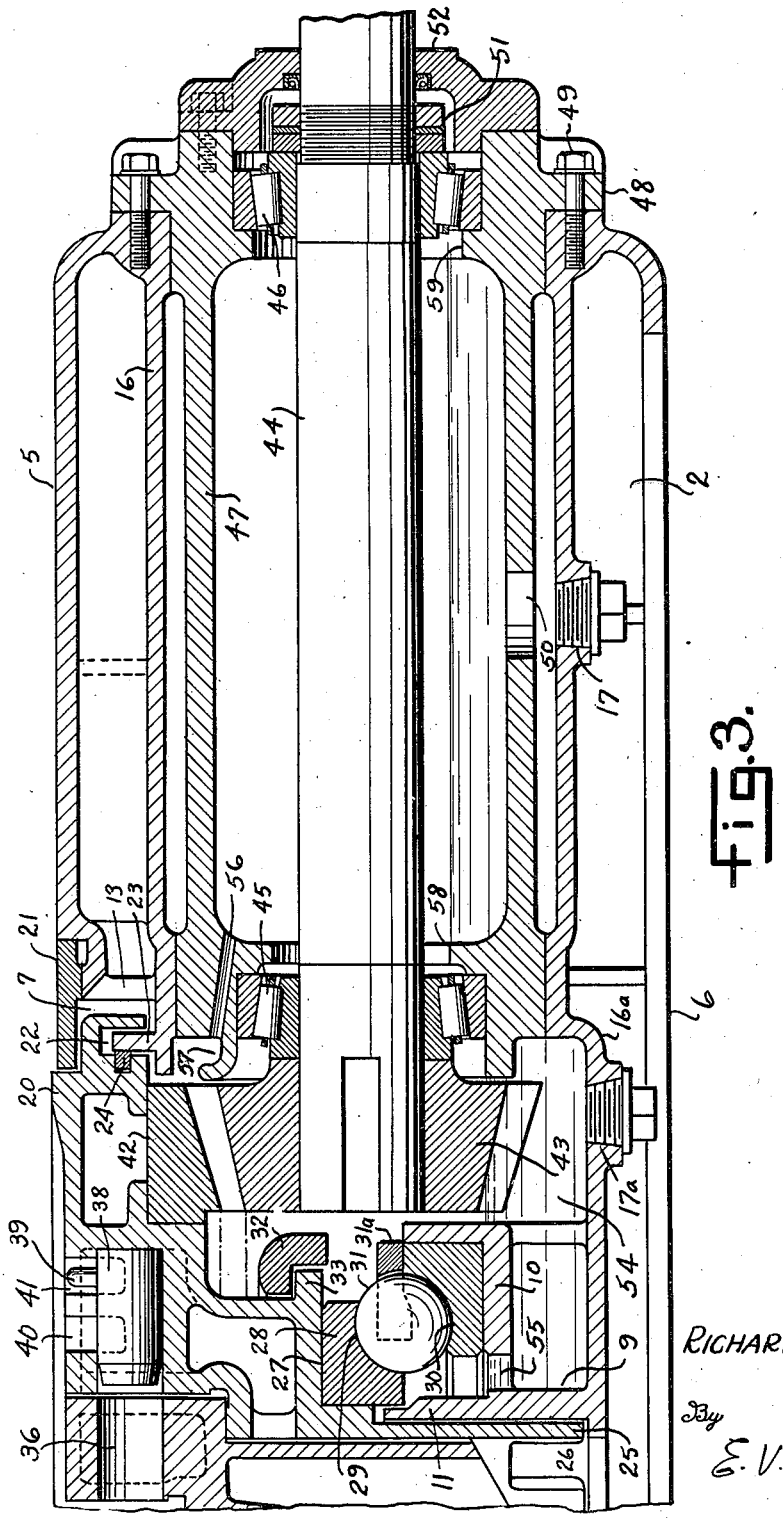

March 17, 1942.                R. R. BLOSS                2,276,561
                         ROTARY DRILLING MACHINE
                         Filed June 5, 1939           4 Sheets-Sheet 3

Inventor
RICHARD R. BLOSS

By
E. V. Hardway
    Attorney

March 17, 1942. R. R. BLOSS 2,276,561
ROTARY DRILLING MACHINE
Filed June 5, 1939 4 Sheets-Sheet 4

Inventor
RICHARD R. BLOSS
By E. V. Hardway
Attorney

Patented Mar. 17, 1942

2,276,561

UNITED STATES PATENT OFFICE 2,276,561

ROTARY DRILLING MACHINE

Richard R. Bloss, Beaumont, Tex., assignor to The International Derrick & Equipment Company of Texas, Beaumont, Texas, a corporation of Texas Application June 5, 1939, Serial No. 277,459

2 Claims. (Cl. 255—23)

This invention relates to a rotary drilling machine.

An object of the invention is to provide a rotary drilling machine embodying a novel lubricating system whereby the gearing for driving the rotary table, the rotary table bearings and the pinion shaft bearings will be efficiently lubricated and foreign matter excluded from the driving gearing, the bearings and the lubricant.

Another object of the invention is to provide, in a rotary drilling machine novel sealing means between the rotary table and the surrounding wall of the base.

A further object of the invention is to provide in a machine of this type a novel type of table lock for locking the rotary table against rotation relative to the table base.

The invention also embodies a novel type of box-like base construction for mounting the rotary table.

It is another object of the invention to provide a combined base and table structure wherein the base is of a novel box-like construction presenting a horizontally disposed top with the table mounted therein so that its upper surface will be substantially flush with the upper surface of the base thus providing ample working space for workmen about the table and also embodying means for efficiently excluding foreign matter from the interior of the machine.

With the above and other objects in view the invention has particular relation to certain novel features of construction, operation and arrangement of parts, examples of which are given in this specification and illustrated in the accompanying drawings, wherein—

Figure 3 shows an enlarged, fragmentary, longitudinal, sectional view.

Referring now more particularly to the drawings wherein like numerals of reference designate the same parts in each of the figures, the numeral 1 designates the base structure, as a whole, which is of an inverted, box-like form having the side walls 2, 2, the end walls 3, 4 and the top 5. The top is approximately horizontal, the entire top surface lying in an approximately horizontal, plane. The lower margins of the walls 2, 2 terminate in the skids, or runners, 6, 6 whose ends are upwardly turned as more accurately shown in Figure 4.

Figure 2:
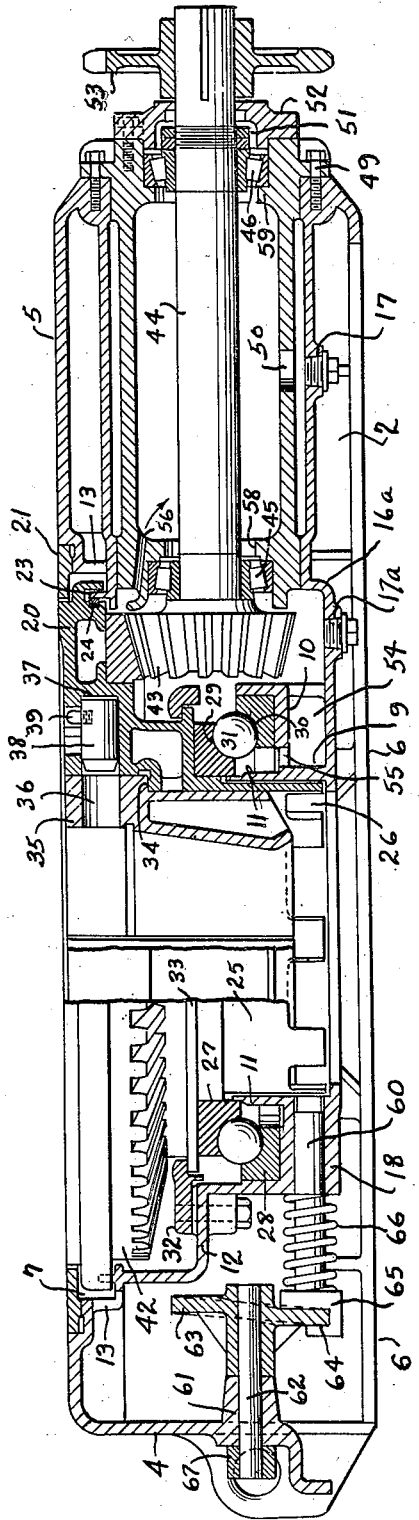
Figure 2 shows a longitudinal, sectional view.
Figure 4:
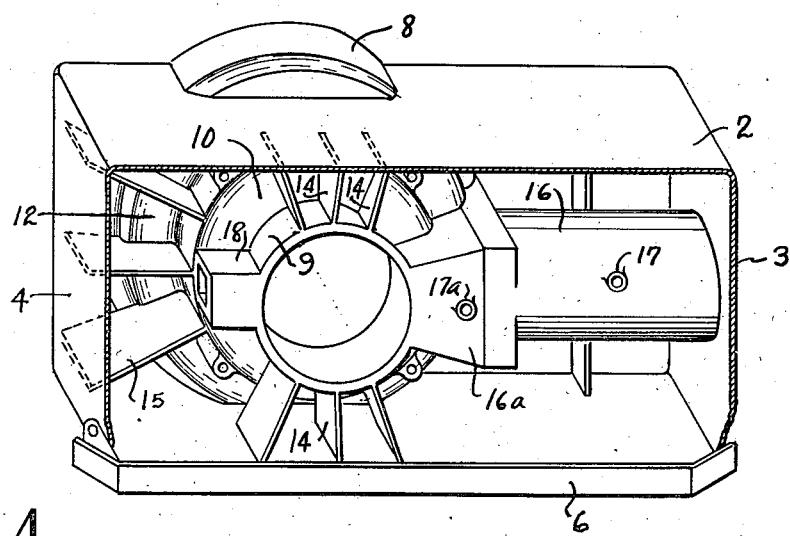
Figure 4 shows a perspective view, partly in section, of the base structure as viewed from the bottom.
Figure 5:
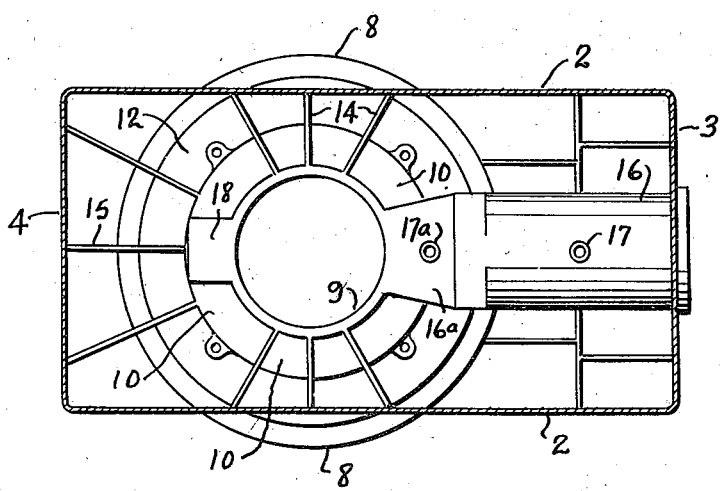
Figure 5 shows a horizontal, sectional view of said structure as viewed from beneath.

The top 5 has a circular opening 7 of somewhat greater diameter than the width of the base, said opening being defined on each side by the laterally arched hoods 8, 8 formed integrally with the side walls 2, 2. The opening 7 is defined by a vertical wall, circular in horizontal cross-section, designated generally by the numeral 9 and shown more clearly in Figures 4 and 5. The lower end of the wall is reduced in diameter, forming, by such reduction, a horizontally extending annular ledge 10 which has an annular, inside, upstanding rim 11 shown more clearly in Figures 2 and 3 and the wall extends on upwardly and is outwardly offset forming the intermediate annular ledge 12 as shown in Figures 2, 4 and 5, and near its upper end is again outwardly offset defining the opening 7, said last mentioned offset portion being provided with ports as 13 through which slush or foreign matter may pass and drop through the base as more accurately hereinafter explained.

The rim 11 and the outer wall thus forming an annular channel within the wall of which the ledge 10 forms the bottom. The circular wall 9 is anchored in place by the radial, vertically extended, webs 14, 15 which are formed integrally with said walls, the webs 14 being formed integrally with the side walls 2 and the webs 15 being formed integrally with the end wall 4 all of which is shown more accurately in Figures 4 and 5.

Between the end wall 3 of the base and the circular wall 9 and formed integrally with said walls there is a circular shell 16 forming a housing, the inner end of which is enlarged and formed into a gear case 16a, the housing is provided with the bottom drain outlets 17, 17a closed by suitable plugs as shown in Figure 3. Opposite the housing 16a the circular wall 9 is provided with an extension 18 later referred to and the purpose of which will be explained.

The base consisting of the parts hereinabove described is preferably cast as a single unit.

Figure 1:
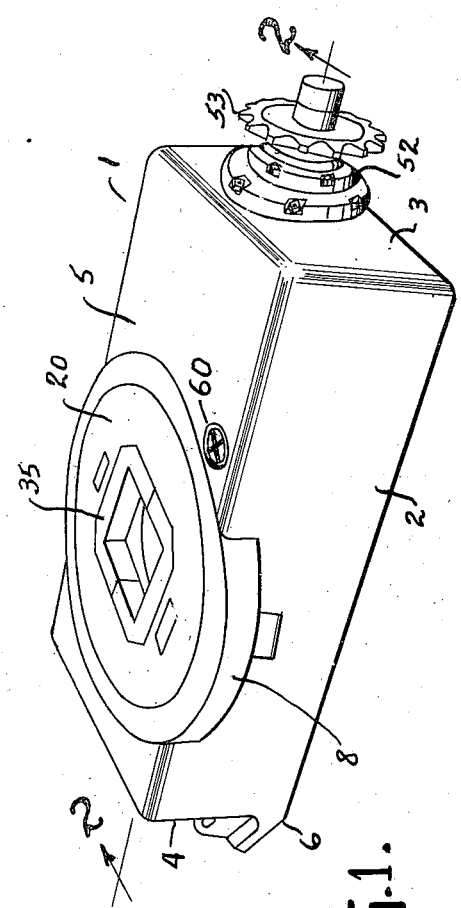
Figure 1 shows a perspective view of the complete machine.

The numeral 20 designates the rotary table as a whole. It is noted in the opening 7 with its upper surface substantially flush with the upper surface of the top 5 of the base. It will be noted from an inspection of Figure 1 that the top surface 5 of the base extends each way beyond the rotary table thus providing walking space at each end for workmen.

Around the opening 7 the top of the base is countersunk and the adjacent margin of the table itself is also countersunk thus providing an annular groove to receive the annular table guard 21 which breaks the joint between the table and the top of the base and wards off much of the slush and other foreign matter that might enter between the table and the base top.

The margin of the table has an annular groove 22, and spaced inwardly from the drain ports 13 and upstanding from, and formed integrally with, the defining wall 9 there is an annular flange 23 which extends up into said groove. Within and fitting closely against the inner wall of the flange 23 there is a suitable, outwardly expansible seal ring 24 which is seated in a circular groove in the rotary table as clearly shown in the Figures 2 and 3. A very efficient seal is thus provided to exclude foreign matter from the gearing and bearings of the rotary table which will be hereinafter described to the end that all foreign matter that may find its way past the guard ring 21 and into the opening 7 will be forced to pass outwardly through the openings 13 and drop down through the base.

The rotary table has the usual central opening for the drill pipe which is surrounded by a depending skirt 25 whose lower end is provided with a series of notches 26 therearound. As will be noted from an inspection of Figures 2 and 3 the lower end of the skirt is reduced in diameter and fitted snugly within the reduced lower end of the wall 9. The reduction of the lower end of said skirt provides the external, downwardly facing, annular bearing face 27 about the skirt of the table against which there is fitted and secured the upper raceway ring 28 which surrounds said skirt. On the ledge 10 within the wall 9 there is the raceway ring 28. The rings 27, 28 have the opposing complemental raceways 29, 30, therein in which the series of ball bearings 31 are confined and which support the table 20. The series of balls 31 are mounted in the usual annular cage 31a. There is an annular hold down ring 32 supported on and anchored to the upper ledge 12 of the wall 9 and which is preferably formed of two sections for ease in assembly. The inner margin of the hold down ring overlaps an external, annular flange 33 on the table, said ring and flange forming an upthrust bearing to maintain the table securely seated on the bearings 31 on which it is mounted.

The upper end of the opening through the table is enlarged and polygonal in shape thus providing an inside supporting seat 34 for the table bushing 35 which is mounted in the table and extends downwardly into the table skirt and is formed to receive conventional drive bushings for engaging and driving the kelly of the drill stem. The bushing 35 is formed of sections, two being shown. The upper end of each section of the bushing is shown with a radial bearing 36, aligned with a corresponding bearing 37 in the table. In this table bearing there is a slidably mounted lock pin 38 provided with a handle 39 which is engageable in either of two notches 40, 41. The handle 39 may be manipulated to release it from said notches and the lock pin 38 may be then moved radially into or out of the corresponding bearing 36 and the bushing thus locked or released from the table, all of which is clearly shown in Figures 2 and 3.

Surrounding and suitable secured to the underside of the margin of the rotary table 20 there is a gear ring 42 formed with bevel-gear teeth which are in mesh with a pinion 43 which is located in the case 16 and which is fixed on the inner end of the pinion shaft 44. This pinion shaft is mounted to rotate in the inner and outer bearing assemblies 45, 46 which in turn are mounted in the inner and outer ends respectively of the pinion bearing case 47. This case is approximately cylindrical in form and is fitted through the housing 16. In its outer end is provided with an external, annular flange 48 which may be bolted to the end wall 3 of the base by means of the cap bolts 49. When installed in place the pinion 43 on the shaft will be properly located in the pinion case 16a and in mesh with the gear ring 42. The pinion bearing casing has a bottom drain opening 50. Threaded onto the shaft in abutting relation with the outer end of the bearing assembly 46 are the lock nuts 51 enclosed by the closure cap 52 and fixed on the extended outer end of the pinion shaft 44 there is the usual sprocket wheel 53 through which the pinion shaft and the rotary table may be turned. The bottom of the pinion case 16a forms a main sump 54 to contain the required quantity of lubricant. The pinion 43, as it rotates, will dip down into the lubricant in said sump and its gear teeth will carry the lubricant up to the teeth of the gearing 42 and lubricate the same. This gearing rotates at a sufficiently high rate of speed to throw a portion of said lubricant forwardly partly onto the flange 33 and partly onto the bearings 31, whereby the gearing, the upthrust bearing surfaces and the bearings 31 will be thoroughly lubricated. The lubricant draining from the supporting bearing assembly will drain into the annular channel in which said assembly is located and will return back into the sump 54 through the drain port 55 through the ledge 10.

The inner end of the pinion bearing case 47, at the top, has an outwardly declining drain duct 56 and also has a cup 57 at the outer end of said duct adjacent the outer ends of the gear teeth. A portion of the lubricant thrown off from the gear teeth will be thrown into said cup and will drain from it through the duct 56 into the pinion bearing case 47.

The ends of this bearing case have the annular weirs 58, 59 extending radially inwardly. The weir, or dam, 58 extends slightly further inwardly than the weir, or dam, 59 so that the lubricant collecting within the case 47 will finally overflow the weir 59 into the bearing assembly 46 and will finally overflow the weir, or dam, 58 into the bearing assembly 45 and the overflow will pass thence back into the main sump 54. A lubricant may be introduced into the main sump as required through the inlet opening 60 in the top of the base which is normally closed by a suitable closure cap. Sediments may be drained out of the pinion bearing case and the main sump through the respective drain openings 17, 17a.

It will be noted that by removing the cap bolts 49 the pinion bearing case, the pinion shaft and pinion and the bearings for said shaft may be removed from the housing 16 or replaced as a unit.

In carrying on drilling operations, particularly in making up and breaking out the drill stem, the torsion to which the drill stem is subjected is often transmitted to the rotary table. Accordingly, means have been provided for locking the rotary table against rotation, when desired, to relieve the gearing of this torsional strain. As illustrated in Figure 2, there is shown a table lock plunger 60 whose inner end works in a radial bearing in the extension 18 and which, when in its inner or active position, is engageable in one of the notches 26. Mounted in a suitable bearing 61 in the end wall 4 of the base there is a cam shaft 62 and fastened on the inner end of said shaft 62 there is a cam shaped disc 63 whose margin runs in a groove 64 of the head 65 on the outer end of the plunger 60. A coil spring 66 which surrounds the outer end of the plunger and which is interposed between the head 65 and the outer end of the extension 18 normally acts to retain the plunger retracted. Fixed on the outer end of the cam shaft 62 is any suitable type of operating handle, indicated generally by the numeral 67 whereby the cam shaft 62 and cam disc 63 may be turned. The disc 63 is shaped so that when it is given a half turn in one direction it will force the plunger 60 inwardly projecting its inner end through an aligned notch 26 of the table skirt 25, thus locking the table against rotation and relieving the gearing of torsional strain. Upon rotation of the cam disc 63 in the other direction, the spring 66 will withdraw the plunger 60 into inactive position to permit the rotary table to turn.

Figure 8:
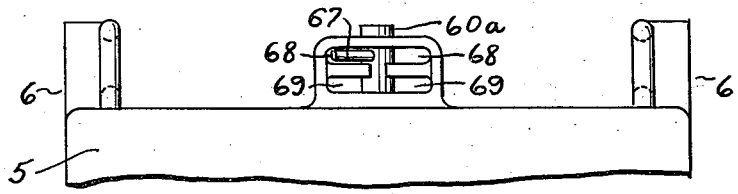
Figure 8 shows a fragmentary, plan view of the locking device illustrated in Figure 7.
Figure 7:
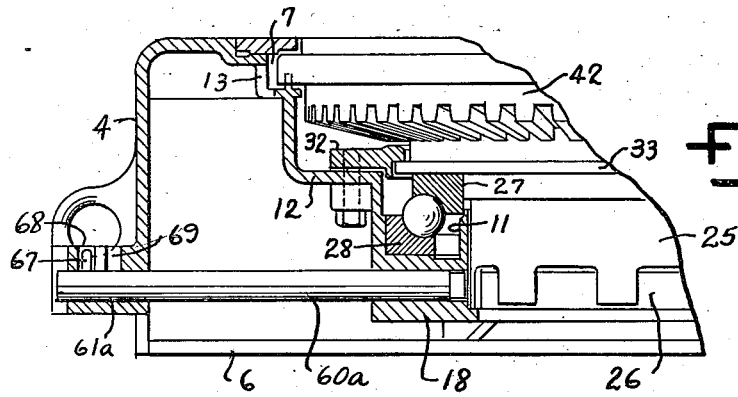
Figure 7 shows a longitudinal, fragmentary, vertical, sectional view, illustrating another embodiment of the table locking device.
Figure 6:
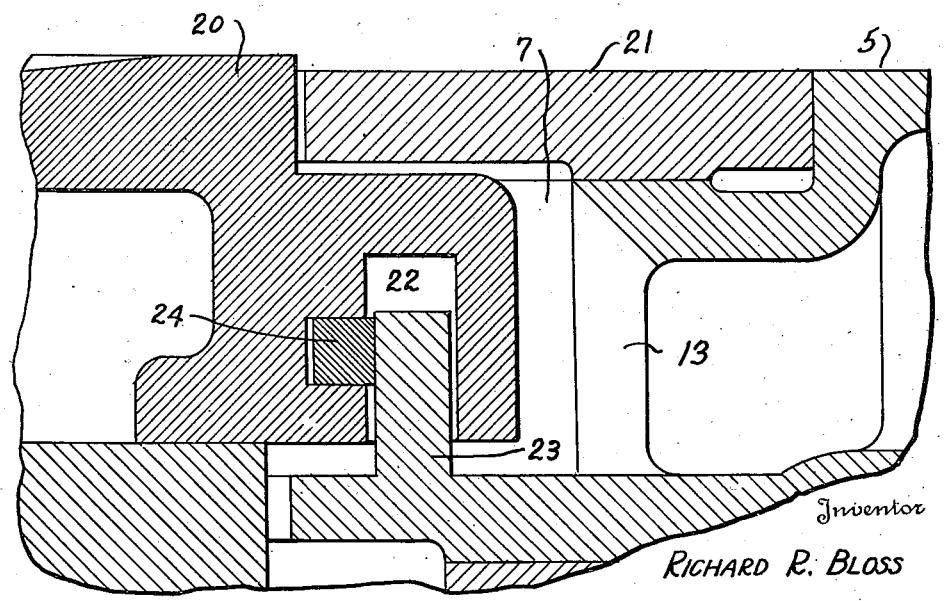
Figure 6 shows an enlarged, fragmentary, vertical, sectional view of the table guard and associated parts.

In the embodiment illustrated in Figures 7 and 8 there is a plunger 60a whose inner end works in the radial bearing of the extension 18. The outer end of this plunger 60a is slidable and rotatable in a bearing 61a carried by the end wall 4. The outer end of the plunger 60a carries an upstanding handle or grip 67 by means of which the plunger may be actuated inwardly through an aligned notch 26 to lock the table against rotation or outwardly into inactive position as shown in Figure 7. The handle 67 may, upon actuation of the plunger 60a, be swung into either of opposing notches 68, 68 when it is desired to lock the plunger in inactive position or into either of the opposing notches 69, 69 when it is desired to lock said plunger in active position.

The drawings and description are illustrative merely and not restrictive, the broad principle of the invention being defined by the appended claims.

What I claim is:

1. In a rotary drilling machine the combination of a unitary base of a rectangular inverted box-like construction, a gear table rotatably mounted on the base, and having an annular groove, the top portion of the base having its ends extended each way beyond the table and the upper surface of the extended ends being substantially flush with the top surface of the table, a hold-down ring forming an upthrust bearing between the table and base, an annular upstanding vertical wall on the base around the table and an annular seal ring forming a seal in said groove between the table and wall to retain a lubricant and to exclude foreign matter.

2. In a rotary drilling machine the combination of a base having a vertical opening and having an upstanding annular wall about the opening, a rotary table rotatably mounted in the opening and having an annular groove, said base having an integral extension on each end about said opening, the top surface of the extension lying in substantially the same plane as the top surface of the rotary table, said base having vertical side walls and end walls which define a box-like construction, an annular stationary ring shaped to fit against the inside surface of the upstanding annular wall and nestle within the table groove to form a seal.

RICHARD R. BLOSS.